United States Patent Office 3,337,049
Patented Aug. 22, 1967

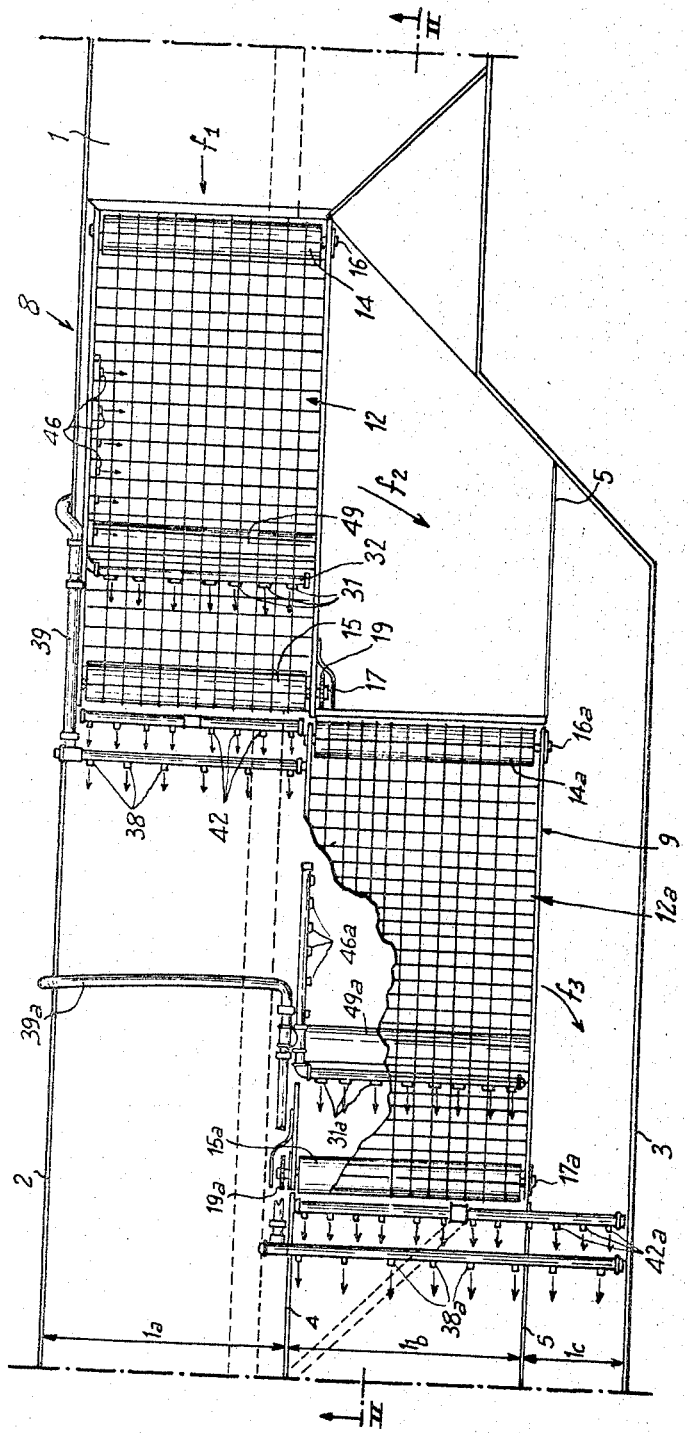

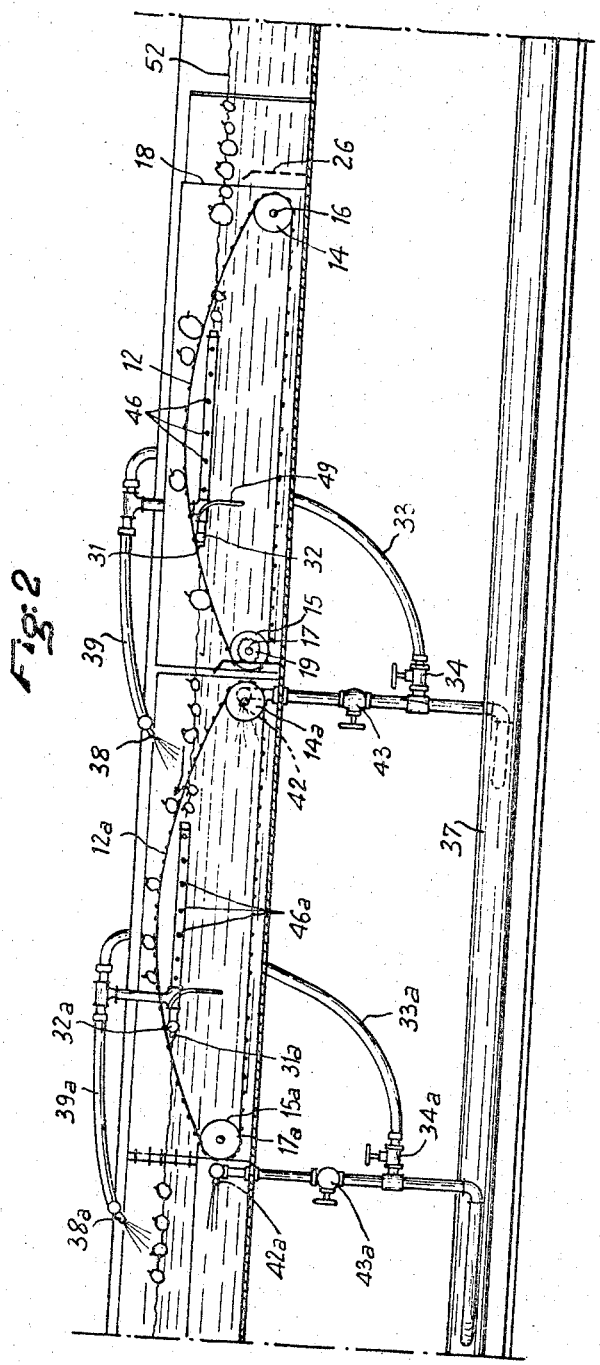

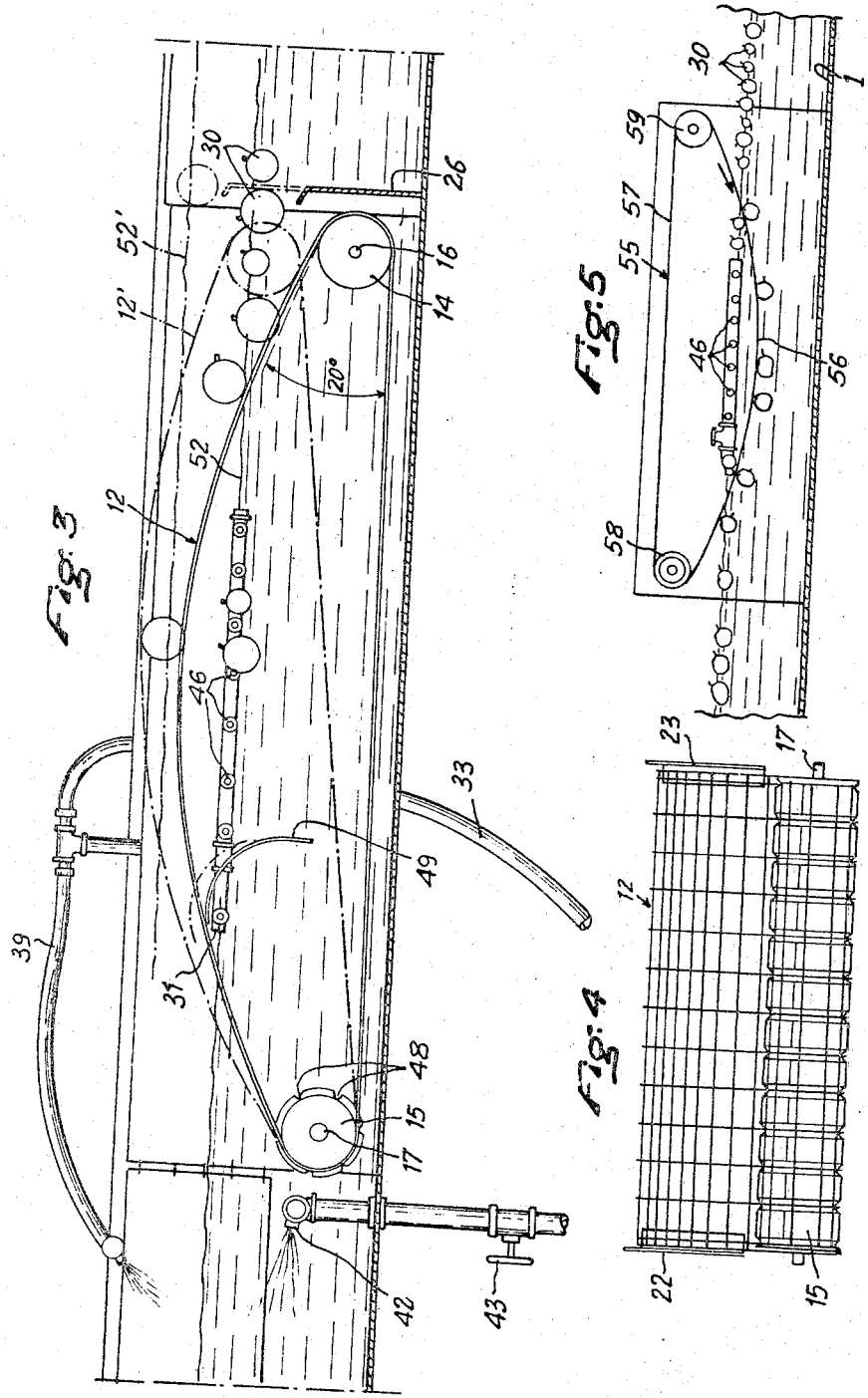

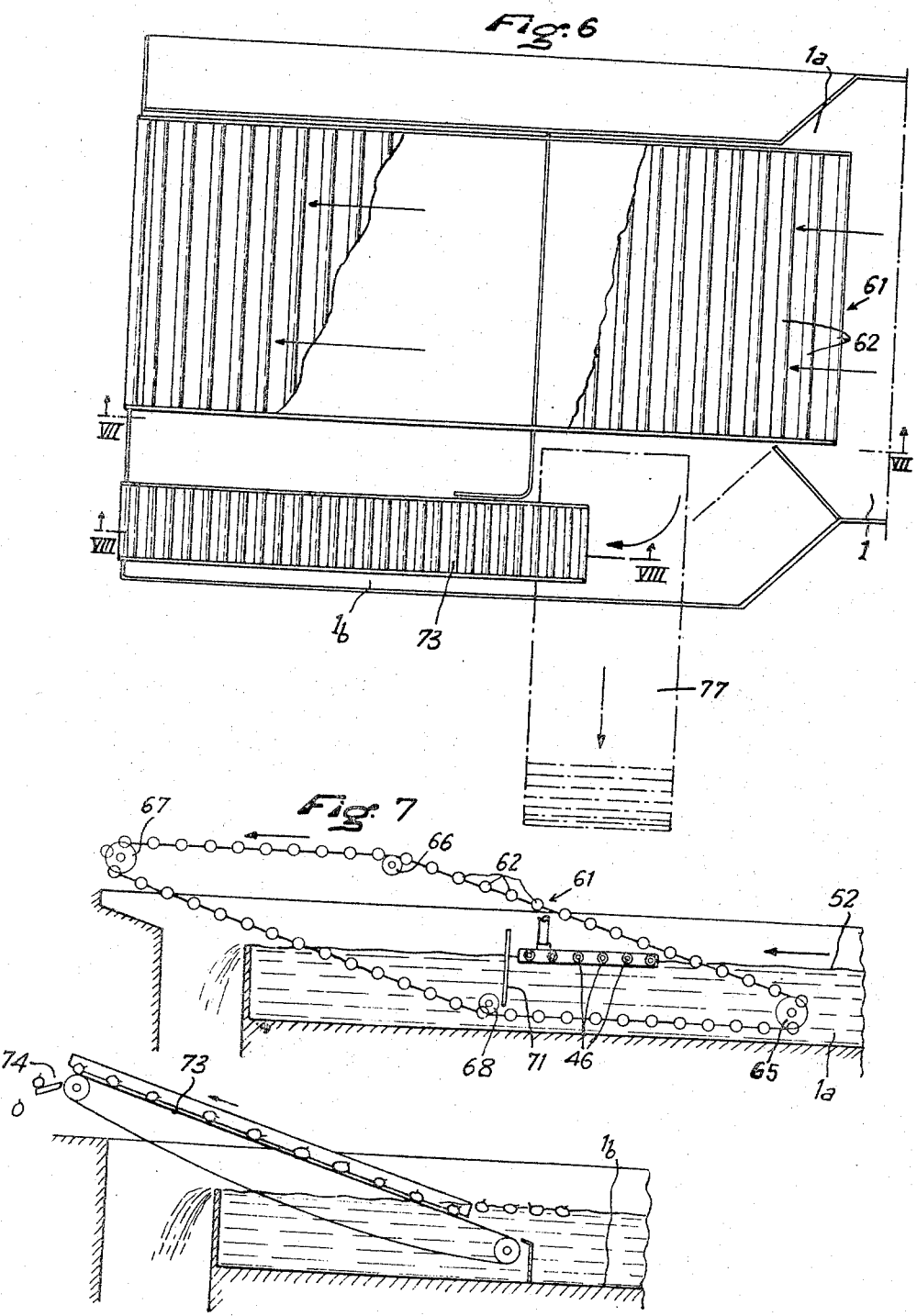

3,337,049
SIZING APPARATUS
Earl W. Carlsen, Yakima, Wash., assignor to Food Industries Research & Engineering, Yakima, Wash., a corporation of Washington
Filed Apr. 26, 1965, Ser. No. 450,909
4 Claims. (Cl. 209—84)

The present invention relates to a new method for the handling of various solid products which may in particular have the dimensions and shapes of fruits, vegetables or berries. It covers the operations which have for their object to separate solids according to their size and especially to calibrate or size objects such as for example pieces of ore, coals, plastics, berries, vegetables, fruits or other solids. The utility of the new method is of particular importance for the preliminary sizing of agricultural products, particularly fruits, between harvesting and the other phases which precede consumption, such as storage, packaging, etc.

The invention also relates to an apparatus and to an installation for carrying the new method into effect.

The new method, apparatus and installation have the advantage of permitting the very rapid separation at a high hourly rate of solids in the required sizes, practically without any impact between these solids, or at most with impacts which are considerably reduced and attenuated with respect to the known art. Thus, pieces of more or less friable material, such as coal, coke or various ores no longer produce, during the treatments according to the invention, the appreciable proportion of fine residue which is the result of the methods so far used. The elimination of the impacts or shocks represents an advantage of very great interest for perishable materials, such as agricultural products and particularly fruits, for example, tomatoes, apples, plums, etc. Moreover, although the invention can be usefully applied to solids of very different natures, it is hereinafter described particularly as regards its applications to agricultural products.

In the usual industry concerned with fruits, it is known to subject these latter to a succession of operations, such as cleaning, possibly in water, washing, drying, polishing, sorting according to qualities, calibration or separation according to size, and packaging. The calibration or sizing, which consists in causing the dry fruits to pass over screens, sieves or other means having apertures of predetermined dimensions, always represents a fairly violent operation which causes considerable bruising. As any bruising is a source of decay, it is no longer possible for the fruits which have suffered such impacts to be kept for a fairly long time; for this reason, the conventional sizing must take place just before the fruit is delivered for consumption; it is therefore necessary until then to preserve the fruits of all the different sizes, this being an economically disadvantageous obligation, because certain sizes could be sold at an early date and others at another time, while it would be desirable simply to reject the fractions of certain dimensions (for example, those which are too small) instead of wasting time in washing, drying, polishing and sorting them with the others, before finally separating them after the sizing operation. It also results in loss of space in the preserving refrigerators.

These disadvantages of the prior art can be completely avoided by means of the method according to the invention, which permits of a sizing being carried out without any bruising and which consequently can be used at any desired moment after harvesting. Actually, the fruits or other agricultural products calibrated or sized by this new method can be kept for a long time, for example, until a very advanced stage of the season, without any change liable to lead to abnormal waste. It thus becomes possible to eliminate in advance the fraction or fractions of fruits which are unsaleable because of their inadequate size, and/or those which can be delivered for quick consumption or in any case at a time different from that when the other fractions capable of being stored will be delivered.

The invention is thus capable of being carried out in different forms, depending on the moment chosen for the calibration. From what has just been explained, it is apparent that one important form of application is a new treatment for fruits, in which the calibration or sizing precedes the sorting according to quality.

In one particularly and highly advantageous form of the invention, the products such as fruits or the like are subjected to a preliminary sizing, that is to say, a sizing carried out before any other treatments; all or certain of these latter treatments, particularly the drying, polishing, sorting, etc., are applied separately to the individual fractions isolated according to size at the time of the preliminary calibration. It is understood that the said other operations, and particularly the sorting according to quality, namely, color, general appearance, defects, etc., is made very much easier by the preliminary calibration, because they are limited just to the fraction of product having the size required at any given moment. Taking into account the amount of labor which is generally required for the sorting according to quality, the new method represents a very considerable industrial progress. Moreover, for the reasons set forth above, it retains all its interest, even if the sorting is effected with electronic means.

Obviously, the calibration or sizing according to the invention can be carried out at the usual time, that is to say, following the sorting, if it is not particularly desired to separate the fractions of certain dimensions before the separation according to qualities. Nevertheless, in this case also, the new method improves the results, since the products finally sized without any impact keep much better than those with which the sizing is carried out in the conventional manner.

The new method according to the invention consists in screening the solids within a liquid.

The result of this procedure is the prevention or at least a strong attenuation of the impacts of the solids with one another and with the screening means, for two reasons at the same time; reduction in the weight of the solids because of the buoyancy of the liquid (Archimedes' law), and mechanical resistance of the liquid (viscosity).

In one particular form of the new method, during the calibration within the liquid, the solids to be screened have imparted thereto a translatory movement parallel to the plane in which the screening is taking place.

According to one preferred form of the invention, the liquid is itself given a movement which assists the advance of the solids to be calibrated. It is preferable to use liquid streams for carrying away the solids which have passed through the screening means.

The liquid used in the new method is any liquid which is harmless with respect to the solids to be treated and having the adequate density and viscosity. Thus, it is possible to employ various saline aqueous solutions, particularly sodium chloride, magnesium chloride or calcium chloride, sodium sulphate or magnesium sulphate, alums, etc. Alcohols or polyalcohols, such as glycol or glycerine, can be used by themselves or in admixture with water. Solutions of sugars, particularly of molasses, or even other liquids, are likewise applicable, those which have been set forth not being limitative in any way. It is obvious that, for economic reasons, it is preferable to use water by itself whenever this is possible.

All adjuvants which are useful for the treatment of given solids are advantageously added to the liquid: such adjuvants are for example detergents, antiseptics, fungicides, coloring agents and/or others.

The apparatus used for carrying the new method into effect comprises screening means placed in a container adapted to contain a liquid, and means for bringing the solids to be calibrated into contact with these screening means, as well as other means for removing the solids from the container.

The screening means may be formed by any known screening means, such as for example screens having round, polygonal or other shaped holes, grids, perforated strips or belts, drums having perforated walls, parallel bars or rods which are fixed with a predetermined and possibly adjustable spacing, etc. One particular embodiment comprises channeled or fluted bars. In the arrangements having bars, these latter may be placed transversely or longitudinally with respect to the path of the solids remaining after the separation of the solids of smaller dimensions. The bars may have different cross-sections, particularly circular, polygonal, etc.

In one particularly advantageous embodiment of the apparatus, the said screening means are movable: they are capable of turning, in the case of a drum having perforated walls or a similar system, or they even form an endless band which is moved by appropriate means. When using parallel bars, which may or may not be fluted, these bars can be driven by two perpendicular lateral chains.

The apparatus is equipped or associated with means for imparting a movement to the liquid in the container.

An installation according to the invention comprises one or more of the new apparatus as defined above, in combination with other devices, particularly those for the supply of solids, possibly various channels or paths for the passage of the liquid and the treated solids, drying, sorting and packaging means, if they are required, and/or other means.

The invention will best be understood after reading the following description and considering the accompanying drawings, which show by way of example several embodiments of the invention. These examples are concerned with installations provided for fruits and particularly apples, but it is quite understood that the assemblies described are also suitable for other solids.

FIGURE 1 shows diagrammatically and in plan view an installation for sizing or grading fruits according to the invention.

FIGURE 2 is a section on the line II—II of FIGURE 1.

FIGURE 3 is a view to a larger scale showing one of the two grading devices of FIGURE 2.

FIGURE 4 is an end view of the grading device, seen in the direction of the arrow IV in FIGURE 3.

FIGURE 5 shows diagrammatically, in section, a reversed arrangement of the grading system shown in FIGURE 3.

FIGURE 6 is a plan view of another embodiment of the device for grading fruits according to the invention.

FIGURE 7 is a section taken on the line VII—VII of FIGURE 6.

FIGURE 8 is a partial section, taken along the line VIII—VIII of FIGURE 6.

The installation for grading fruits, such as for example apples, shown diagrammatically in FIGURES 1 and 2 comprises a channel 1 in which a stream of liquid, such as ordinary water, saline water or any other suitable liquid circulates in the direction of the arrow $f1$, and the apples poured by any suitable conventional means (not shown) into the upstream section of the said channel travel by flotation on the surface of said liquid.

In the grading installation, the channel 1 widens out and forms a certain number of troughs, for example three, which are respectively indicated by 1a, 1b, and 1c, defined by the lateral walls 2, 3 of the said channel and by intermediate longitudinal partitions 4, 5.

As a general rule, the channel can form any desired number of troughs; these latter can be arranged parallel to one another or at various angles relatively to one another.

Arranged in the first trough 1a is a first grading device represented as a whole by 8 and designed to hold back the large fruits, while it allows the small and medium fruits to pass therethrough, these being deflected into the second trough 1b, where a second grading device 9 holds back the medium fruits and only allows the small fruits to pass through, these being deflected into the third trough 1c.

Finally, at the outlet from the three troughs 1a, 1b and 1c, the large, medium and small fruits float to the station, where they are later taken up by a suitable conventional elevator system (not shown).

The two grading devices 8 and 9 are similar and only differ essentially in the size of their grading meshes.

Each of them, for example the grading device 8, comprises an endless flexible grid 12 (see also FIGURES 3 and 4) having square meshes of suitable dimensions for permitting the fruits of medium or small size to pass therethrough but for retaining the large fruits. It is supported by an upstream drum 14 and a downstream drum 15 respectively mounted on two horizontal transverse shafts 16, 17 supported at their ends in a frame 18. At the frame, one of the drums, for example the drum 15, is driven in rotation by any suitable system, such as for example a chain transmission, of which there is indicated a toothed wheel at 19 fast with the shaft 17, so that the upper run of the grid travels in the same direction as the liquid. The two drums 14 and 15 are at the same level and completely immersed in the channel 1. The lower run of the grid 12 extends in a substantially horizontal direction and is maintained with a substantially flat horizontal configuration under the effect of its own tension, while the upper run of the said grid is arched so as to emerge from the liquid, forming an acute angle of for example 20° with the free surface of said liquid and to be immersed again in the liquid before passing over the downstream drum 15, this arched configuration of the upper run of the grid being ensured by two lateral guides 22, 23 (FIGURE 4) of corresponding shape, on which respectively slide the two margins of the upper run of the grid.

A feed plate 26, which is adjustable in height and arranged vertically in front of the upstream drum 14, permits the flow of water and of entrained apples 30 to be controlled.

The liquid stream carrying the apples is supplied, at least superficially, by liquid jets under pressure projected through nozzles 31 mounted on a transverse pipe 32 in the downstream direction, the said pipe being itself supplied by a pipe 33 connected by means of a control cock 34 to a main pipe 37 for liquid under pressure.

A group of supplementary jets, projected by nozzles 38 fed by a pipe 39 also connected to the pipe 33, are directed on to the apples downstream of the downstream drum 15 of the grading grid.

Arranged in the depth of the layer of water which flows in the channel is another group of nozzles 42, always directed downstream and also fed with liquid under pressure by means of a cock 45 which is also supplied from the main pipe 37.

Arranged under the arch formed by the emergent portion of the grid 12 and at the level of the free surface of the liquid is a row of jets 46 which are also supplied by the pipe 33 and are directed transversely towards the second trough 1b of the channel, with the object of pushing into the latter the small and medium sized fruits which have passed through the grid 12.

The driving drum 15 of the grid has longitudinal flutings 48, which are engaged by the transverse bars of the grid, in order to avoid any slip in the driving movement, as well as annular grooves 49 (FIGURE 4), arranged in transverse planes and adapted to receive the longitudinal elements of the grid.

The elements of the grading device 9 arranged in the trough 1b of the channel bear the same reference numerals as the corresponding elements of the grading device 8 disposed in the first trough 1a of the channel, but with the index a. The size of the meshes of the grid 12a or the spacing of the rods is such that the grid holds back the fruits of medium size and only allow the small size fruits to pass therethrough.

The operation of the installation is as follows:

All the mixed fruits arrive by flotation in the direction of the arrow f1 and into the channel 1 at the inlet of the first grading device 8. Here they meet the ascending part of the upper run of the grid 8, which is moving in the same direction as the fruits, so that the fruits too large to pass through the meshes of this grid are raised by the arched portion of the latter, and then are redeposited downstream by the descending part of the said upper run of the grid, and again float on the liquid, while the fruits of medium and small size pass through the meshes of the grid and are not raised from the liquid, so that they continue to float and are carried to the deflecting station under the arch formed by the upper run of the grid. At this station, they are deflected by the transverse jets of liquid from the nozzles 46, which at the same time impart motion to the surface layers of the liquid in the direction of the arrow f2, so that these fruits of small and medium size are conducted into the trough 1b of the channel and to the inlet of the second grading device 9.

The large size fruits, which are again floating downstream of the grid 12, are carried to the station in the first trough 1a, where they are taken up by the elevator device referred to above.

In the second grading device 9, the same procedure starts again, that is to say, the fruits of medium size are raised by the grid 12a and start floating again at the downstream part of the latter, from whence they are finally lifted by an elevator forming the end of the trough 1b, while the small size fruits, which are beneath the arch of the upper run of the grid 12a, are deflected transversely by the jets from the nozzles 46a in the direction of the arrow f3 and are consequently conducted into the third trough 1c, where they also progress on the surface of the liquid to the station from whence they are taken up by a corresponding elevator device.

The grading of all the fruits is thus effected without any impact, since those which pass through the grids are constantly in a state of flotation and are never lifted out of the water, while the fruits of larger dimensions, which are unable to pass through the meshes of the grids, are gently raised by the latter in their upstream sections and are redeposited, also very gently, on the surface of the liquid at their downstream section.

It may be desirable to modify to a certain degree the slope which the grids assume at the regions where they emerge therefrom. This is why, in one embodiment, the assembly of a grid, such as for example the grid 12 in FIGURE 3, is able to pivot about the axis of its downstream drum 15 from its lowest position shown in full lines in FIGURE 3 to its highest position shown in chain-dotted lines at 12', where it forms a smaller angle with the surface of the liquid than in its low position, the said level of the liquid indicated at 52 and 52', respectively, obviously being adjusted as a function of the height at which the grid is placed. It would also be possible to arrange for the grid assembly to rise or fall parallel to itself.

A guide plate 49, placed along the downstream part of the arch of the grid 12, causes the fruits which reach this position to be displaced transversely without engaging the grid, whch would tend to drive them towards the downstream end.

If the previous elimination of the small fruits is desired, it is possible to employ the modification shown in FIGURE 5; the operative run of the grid 55, instead of being the upper run thereof, is formed by the lower run 56, always with an arched configuration, but which itself is immersed in the liquid, while the upper run 57, which is substantially flat, is completely above the said liquid.

In this modification, the large size fruits, instead of being lifted out of the water by the grid, are on the contrary carried along and immersed more deeply in the liquid and then they are released at the downstream end of the said grid and resume the normal floating position. The fruits of smaller size have been able to continue floating, passing through the meshes of the grid, and are disposed inside the loop formed by the said grid, from which they are likewise discharged transversely by the liquid jets of the nozzles 46, as in the embodiment shown in FIGURES 1 to 4.

It is obvious that in the constructional form shown in FIGURE 5, the direction of rotation of the drums 58 and 59 over which the grid passes is reversed with respect to that of the embodiment shown in FIGURES 1 to 4, since it is the lower run of the grid instead of the upper run which ensures the continuity of the progression of the fruits from the upstream end of the installation towards the downstream end.

In another embodiment, which is shown diagrammatically in FIGURES 6 to 8, the grading element is designed and arranged so as to serve at the same time as an elevator for the graded fruits, that is to say, in a single apparatus, the fruits are simultaneously calibrated while floating and then lifted out of the liquid.

In this installation, the movable grading element is formed by an endless chain 61 having parallel bars 62, the spacing of which corresponds to the size of the fruits to be graded. These bars may be of cylindrical form with a constant diameter throughout their length or, on the contrary, they may have a form of which the generatrix has any desired undulated configuration.

The chain of bars 61 passes over a lower upstream drum 65 immersed in the channel 1, over an upper intermediate drum 66 situated above the level 52 of the liquid, over a downstream drum 67 located at the same level as the intermediate drum 66 and, finally, over a lower intermediate drum 68 which is also immersed in the channel 1 and disposed substantially at the level of the upstream drum 65.

A baffle member 71, formed by a vertical plate disposed at the downstream end of the horizontal part of the lower run of the roller chain, retains the floating fruits and prevents them from continuing to move towards the downstream end, so as to hold them in the zone of the nozzles 46 which direct them, for example, to a simple elevator 73, which then no longer serves for grading purposes (see particularly FIGURE 8), but which serves simply, in accordance with a conventional procedure, to remove the floating fruits and to bring them to a higher level, from which they are delivered as indicated at 74.

In the embodiment shown diagrammatically in FIGURES 6 and 7, the fruits brought to the arrangement are graded in two categories, namely: the large size fruits, which are raised and delivered by the grading elevator 61 and the fruits of smaller size, which pass between the bars of the latter and continue to float, in order then to be discharged transversely by the jets 46 towards the simple elevator 73.

In a modification, the simple elevator 73, located at the lateral outlet of the grading elevator 61, is replaced by a second grading elevator 77 which is capable of again sorting the fruits into two sizes, namely: a medium size of fruits lifted by this grading elevator 77 and a smaller size of fruits, which will be discharged beneath the said grader 77 and would in their turn be able to be removed from the liquid by a simple elevator similar to the elevator 73.

Obviously, the invention is not limited to the embodiments which have been described and illustrated, and modifications may be incorporated thereto without thereby departing from the scope of the invention.

I claim:

1. An apparatus for sizing articles of commerce comprising:

container means for containing a body of liquid in which articles of commerce can be at least partially immersed to at least partially buoy up the same, means for causing said articles to move in a predetermined direction, means for effecting a sizing operation to take place in a vertical direction and effective to deflect said articles vertically, including an endless traveling sizing member having openings of a size to pass articles smaller than a predetermined size whereby the larger articles are conveyed on in the direction of movement of said traveling sizing member, but the remaining articles are vertically released by said traveling sizing member for continued at least partial immersion by said liquid body, said endless traveling sizing member having an upper flight and a lower flight, one of which engages the articles to be separated, said one flight being bowed and the arc of the bow intersecting the plane of the surface of the liquid body so that the end portions of said one flight are on one side of said plane and the central portions are on the other, means for creating a current flow in a direction oblique to the direction of travel of said traveling sizing member for causing said remaining articles to move in a direction oblique to the direction of travel of said traveling sizing member.

2. Apparatus for sizing articles of commerce comprising:

container means for containing a body of liquid in which articles of commerce can be at least partially immersed to partially buoy up the same and prevent injury to the same, means for causing a sizing operation to take place in a vertical direction by deflecting vertically articles of a predetermined size and larger, said means including an endless traveling sizing member for engaging said articles of commerce, said traveling sizing member having an upper flight and a lower flight with the upper flight having an upwardly inclined article-receiving portion extending from a point below the level of the surface of the body to a point thereabove and said upper flight having a descending discharge portion extending from a point above the liquid level to a point below the liquid level so that said larger articles are lifted out of said liquid body to be separated from the remaining articles and then are gently redeposited in said liquid body by said upper flight of said endless traveling sizing member, said traveling sizing member having openings of a size to pass articles smaller than said predetermined size whereby larger articles are conveyed on in the direction of movement of said traveling sizing member by said traveling sizing member, but the remaining articles are vertically released through said openings by said traveling sizing member for continued at least partial immersion in said liquid body, means for causing said remaining articles to move in a direction horizontally oblique to the direction of travel of said traveling sizing member.

3. An apparatus as set forth in claim 2 in which the means for causing movement of said articles of commerce includes jet means for supplying streams of liquid in the desired direction of movement of said articles.

4. Apparatus as set forth in claim 1 in which the portions of said traveling sizing member that first engage said articles of commerce travels in a downward direction.

References Cited

UNITED STATES PATENTS

| | | | |
|---|---|---|---|
| 1,109,099 | 9/1914 | Williams. | |
| 2,840,236 | 6/1958 | Belk | 209—84 |
| 3,251,466 | 5/1966 | Fleishman | 209—99 |

M. HENSON WOOD, Jr., *Primary Examiner.*

J. N. ERLICH, *Assistant Examiner.*